(12) United States Patent
Weydert et al.

(10) Patent No.: US 7,096,903 B2
(45) Date of Patent: Aug. 29, 2006

(54) PNEUMATIC TIRE HAVING A COMPONENT CONTAINING A RUBBER TRIBLEND AND SILICA

(75) Inventors: Marc Weydert, Luxembourg (LU); Georges Marcel Victor Thielen, Schouweiler (LU); Christian Kaes, Schrondweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 119 days.

(21) Appl. No.: 10/610,224

(22) Filed: Jun. 30, 2003

(65) Prior Publication Data

US 2004/0261927 A1    Dec. 30, 2004

(51) Int. Cl.
*B60C 1/00* (2006.01)
*B60C 11/00* (2006.01)

(52) U.S. Cl. .............. 152/209.1; 152/209.5; 152/450

(58) Field of Classification Search .......... 152/525, 152/237, 547, 564, 905, 209.1, 209.5
See application file for complete search history.

(56) References Cited

U.S. PATENT DOCUMENTS

| | | | |
|---|---|---|---|
| 4,398,582 A * | 8/1983 | Yuto et al. ............... | 152/209.5 |
| 4,510,291 A * | 4/1985 | Kawakami ................. | 525/237 |
| 4,737,535 A * | 4/1988 | Furukawa et al. .......... | 524/113 |
| 4,866,131 A | 9/1989 | Fujimaki et al. ............ | 525/96 |
| 4,929,679 A * | 5/1990 | Akita et al. ................. | 525/194 |
| 5,569,697 A | 10/1996 | Ferrandino et al. ......... | 524/492 |
| 5,616,639 A * | 4/1997 | Lucas ......................... | 524/262 |
| 5,834,552 A * | 11/1998 | Kawazura et al. .......... | 524/526 |
| 5,872,179 A | 2/1999 | Hubbell ...................... | 524/526 |
| 6,242,523 B1 | 6/2001 | Blok et al. .................. | 524/495 |
| 6,359,045 B1 * | 3/2002 | Jeske et al. ................. | 524/201 |
| 2003/0114577 A1 | 6/2003 | Yatsuyanagi et al. ....... | 524/495 |

FOREIGN PATENT DOCUMENTS

| | | | |
|---|---|---|---|
| EP | 346147 | * | 12/1989 |
| EP | 0738613 | | 10/1996 |
| EP | 0747426 | | 12/1996 |
| EP | 921150 | * | 6/1999 |
| EP | 1035164 | | 9/2000 |
| JP | 2002-97308 | * | 4/2002 |

* cited by examiner

*Primary Examiner*—Justin Fischer
(74) *Attorney, Agent, or Firm*—John D. DeLong

(57) ABSTRACT

The invention is directed to a pneumatic tire having a component comprising a vulcanizable rubber composition comprising, based on 100 parts by weight of elastomer (phr),
(A) from about 35 to about 65 phr of a solution polymerized styrene-butadiene rubber with a styrene content of from about 38 to about 50 percent by weight and a Tg of from about −22° C. to about −10° C.;
(B) from about 10 to about 35 phr of an emulsion or solution polymerized styrene-butadiene rubber with a styrene content of from about 20 to about 40 percent by weight and a Tg of from about −55° C. to about −28° C.;
(C) from about 10 to about 35 phr of polybutadiene; and
(D) from about 10 to about 100 phr of silica.

15 Claims, No Drawings

PNEUMATIC TIRE HAVING A COMPONENT CONTAINING A RUBBER TRIBLEND AND SILICA

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

ESBR/silica systems give rise to tread compounds with excellent tear/tensile properties, good wet performance, but tend to be deficient in rolling resistance and wear properties. Mid-styrene SSBR silica systems give rise to tread compounds with excellent wet/rolling resistance/wear balance, but they tend to be somewhat deficient in tear/tensile properties.

SUMMARY OF THE INVENTION

The present invention is directed to a pneumatic tire having a component comprising a vulcanizable rubber composition comprising, based on 100 parts by weight of elastomer (phr), (A) from about 35 to about 65 phr of a solution polymerized styrene-butadiene rubber with a styrene content of from about 38 to about 50 percent by weight and a Tg of from about −22° C. to about −10° C.;

(B) from about 10 to about 35 phr of an emulsion polymerized styrene-butadiene rubber with a styrene content of from about 20 to about 40 percent by weight and a Tg of from about −55° C. to about −28° C.;

(C) from about 10 to about 35 phr of polybutadiene; and (D) from about 10 to about 100 phr of silica.

DESCRIPTION OF THE INVENTION

The invention is directed to a pneumatic tire having a component comprising a vulcanizable rubber composition comprising, based on 100 parts by weight of elastomer (phr), (A) from about 35 to about 65 phr of a solution polymerized styrene-butadiene rubber with a styrene content of from about 38 to about 50 percent by weight and a Tg of from about −22° C. to about −10° C.;

(B) from about 10 to about 35 phr of an emulsion or solution polymerized styrene-butadiene rubber with a styrene content of from about 20 to about 40 percent by weight and a Tg of from about −55° C. to about −28° C.;

(C) from about 10 to about 35 phr of polybutadiene; and (D) from about 10 to about 100 phr of silica.

One component of the rubber composition is from about 35 to about 65 phr of a solution polymerized styrene-butadiene rubber with a styrene content of from about 38 to about 50 percent by weight and a Tg of from about −22° C. to about −10° C., expressed as the Tg midpoint for the non-oil extended polymer. Suitable solution polymerized styrene-butadiene rubbers may be made, for example, by organo lithium catalyzation in the presence of an organic hydrocarbon solvent. Suitable solution polymerized styrene-butadiene rubbers are available commercially, such as Enichem R74509; Dow SLR 6610; Nippon Zeon NS 412; Sumitomo SE8529; and the like.

Another component of the rubber composition is from about 10 to about 30 phr of an emulsion or solution polymerized styrene-butadiene rubber with a styrene content of from about 20 to about 40 percent by weight and a Tg of from about −55° C. to about −28° C. By emulsion polymerization prepared E-SBR, it is meant that styrene and 1,3-butadiene are copolymerized as an aqueous emulsion. Such are well known to those skilled in such art. Suitable emulsion or solution polymerized styrene-butadiene rubbers are available commercially, such as (ESBR:) SBR1712; SBR1502; 31% Styrene ESBR; (SSBR:) JSR HPR240E; Asahi Tufdene3330, Goodyear SLF1216, Goodyear SLF31X22, Dow SLR 6410, and the like.

Another component of the rubber composition is from about 10 to about 35 phr of polybutadiene. Suitable polybutadiene rubbers may be prepared, for example, by organic solution polymerization of 1,3-butadiene. The BR may be conveniently characterized, for example, by having at least a 90 percent cis 1,4-content. Suitable polybutadiene rubbers are available commercially, such as Budene® 1207 from Goodyear and the like.

The rubber composition may optionally include from 0 to about 20 phr of 3,4-polyisoprene rubber. The 3,4-polyisoprene rubber (3,4-PI) is considered beneficial for the purpose of enhancing the tire's traction when it is used in a tire tread composition. The 3,4-PI is more fully described in U.S. Pat. No. 5,087,668 which is incorporated herein by reference.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 100 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from about 5 to about 50 phr of carbon black Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

The vulcanizable rubber composition may include both silica and carbon black in a combined concentration of from about 20 to about 100 phr, in any weight ratio of silica to carbon black. In one embodiment, the vulcanizable rubber composition includes both silica and carbon black in approximately the same weight amounts, i.e., a weight ratio of about 1.

Other fillers may be used in the rubber composition including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula:

$$Z\text{-}Alk\text{-}S_n\text{-}Alk\text{-}Z \qquad I$$

in which Z is selected from the group consisting of

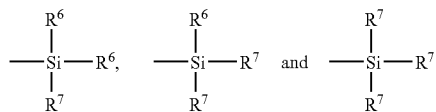

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention-include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisuifide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymnethylsilylpentyl) trisulfide, 3,3'-bis(trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula I, preferably Z is

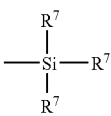

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE I

In this example, three rubber compounds are compared. Samples 1 and 2 represent control samples typical of the prior art. Sample 3 is representative of the present invention.

The elastomers were compounded with standard amounts of conventional curatives and processing aids as indicated in Table 1, and cured with a standard cure cycle. Cured samples were evaluated for various physical properties following standard tests protocols as indicated in Table 2.

TABLE 1

Compound Recipe

| Sample | 1 | 2 | 3 |
|---|---|---|---|
| Polybutadiene[1] | 30 | 30 | 30 |
| ESBR, 40% styrene[2] | 70 | 0 | 0 |
| SSBR, 25% styrene[3] | 0 | 70 | 0 |
| SSBR, 46% styrene[4] | 0 | 0 | 55 |
| ESBR, 25% styrene[5] | 0 | 0 | 15 |
| Zinc Oxide | 2.5 | 2.5 | 2.5 |
| Process Oil | 26.5 | 26.5 | 26.5 |
| Stearic Acid | 3 | 3 | 3 |
| Wax | 1.8 | 1.8 | 1.5 |
| Silica | 86 | 86 | 85 |
| Sulfur | 1.4 | 1.4 | 1.4 |
| Antidegradants[6] | 3 | 3 | 3 |
| Accelerators[7] | 4 | 4 | 3.5 |
| Coupling Agent[8] | 13.8 | 13.8 | 13.6 |

TABLE 1-continued

Compound Recipe

| Sample | 1 | 2 | 3 |
|---|---|---|---|
| Coupling Agent[9] | 2 | 2 | 2 |
| Alpha-methylstyrene | 5 | 5 | 5 |

[1]Budene ® 1207
[2]emulsion polymerized styrene-butadiene rubber with 40% styrene, Goodyear
[3]JSR T596
[4]SLR-6610, Dow Chemical Company
[5]emulsion polymerized styrene-butadiene rubber with 25% styrene, Dow
[6]p-phenylenediamine type
[7]sulfenamide and guanidine type
[8]silane disulfide type, 50 percent by weight on carbon black carrier
[9]silane tetrasulfide type

TABLE 2

| Sample | Control 1 | Control 2 | 3 |
|---|---|---|---|
| Viscosity | 49 | 56 | 43 |
| Shore A | 68.5 | 66.5 | 63.8 |
| Rebound 0° C. | 12.3 | 7.7 | 6.5 |
| Rebound 100° C. | 53 | 62 | 60.8 |
| Elongation, % | 600 | 376 | 560 |
| True Tensile, MPa | 123 | 84 | 125 |
| Modulus @ 300% | 8.3 | 14.3 | 8.7 |
| Tensile Strength, MPa | 17.6 | 17.6 | 18.9 |
| Tear Strength, N/mm | 31.1 | 15.4 | 29.4 |
| RPA G' (1% sw1) | 2.821 | 2.273 | 2.581 |
| RPA TD (10% sw2) | 0.167 | 0.119 | 0.121 |
| Drum Abrasion (Vol. Loss) | 136.6 | 88.7 | 113 |

As can be seen from Table 2, ESBR/silica systems give rise to tread compounds with excellent tear/tensile properties, good wet performance, but tend to be deficient in rolling resistance and wear properties. One such example of a compound is Sample 1. Mid-styrene SSBR silica systems give rise to tread compounds with excellent Wet/RR/Wear balance, but they tend to be somewhat deficient in tear/tensile properties. One example of such a compound is Sample 2. This disadvantage can be overcome by the use of high styrene SSBR of Tg −22° C. to −10° C. The addition of an additional mid-Tg SBR (Tg −55° C. to −28° C.) may be required in order to maintain the G' onset at an acceptably low temperature. The mid-styrene SBR may also act as a compatibilizer between the BR phase and the high styrene SSBR.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a tread comprising a vulcanizable rubber composition comprising, based on 100 parts by weight of elastomer (phr),
    (A) from about 35 to about 65 phr of a solution polymerized styrene-butadiene rubber with a styrene content of from about 38 to about 50 percent by weight and a Tg of from about −22° C. to about −10° C.
    (B) from about 10 to about 35 phr of an emulsion or solution polymerized styrene-butadiene rubber with a styrene content of from about 20 to about 40 percent by weight, and a Tg of from about −55° C. to about −28° C.;
    (C) from about 10 to about 35 phr of polybutadiene; and
    (D) from about 10 to about 100 phr of silica;
    wherein the emulsion or solution polymerized styrene-butadiene rubber with a styrene content of from about 20 to about 40 percent by weight acts as a compatibilizer between the polybutadiene and the solution polymerized styrene-butadiene rubber with a styrene content of from about 38 to about 50 percent by weight and a Tg of from about −22° C. to about −10° C.

2. The pneumatic tire of claim 1, wherein said vulcanizable rubber composition comprises about 50 to about 100 phr of silica.

3. The pneumatic tire of claim 1, wherein said tread is a tread cap.

4. The pneumatic tire of claim 1, wherein said vulcanizable rubber composition further comprises from about 5 to about 50 phr of carbon black.

5. The pneumatic tire of claim 1, wherein said vulcanizable rubber composition comprises silica and carbon black in a combined concentration of from about 20 to about 100 phr.

6. The pneumatic tire of claim 1, wherein said vulcanizable rubber composition comprises silica and carbon black in a combined concentration of from about 20 to about 100 phr and a weight ratio of about 1.

7. The pneumatic tire of claim 1, wherein said vulcanizable rubber composition further comprises from 0 to about 20 phr of 3,4-polyisoprene.

8. A pneumatic tire having a tread comprising a vulcanizable rubber composition comprising, based on 100 parts by weight of elastomer (phr),
    (A) from about 35 to about 65 phr of a solution polymerized styrene-butadiene rubber with a styrene content of from about 38 to about 50 percent by weight and a Tg of from about −22° C. to about −10° C.;
    (B) from about 10 to about 35 phr of an emulsion or solution polymerized styrene-butadiene rubber with a styrene content of from about 20 to about 40 percent by weight and a Tg of from about −55° C. to about −28° C.;
    (C) from about 10 to about 35 phr of polybutadiene; and
    (D) from about 10 to about 100 phr of silica;
    wherein the emulsion or solution polymerized styrene-butadiene rubber with a styrene content of from about 20 to about 40 percent by weight is compatible with the solution polymerized styrene-butadiene rubber with a styrene content of from about 38 to about 50 percent by weight and a Tg of from about −22° C. to about −10° C.

9. The pneumatic tire of claim 8, wherein said vulcanizable rubber composition comprises about 50 to about 100 phr of silica.

10. The pneumatic tire of claim 8, wherein said tread is a tread cap.

11. The pneumatic tire of claim 8, wherein said vulcanizable rubber composition further comprises from about 5 to about 50 phr of carbon black.

12. The pneumatic tire of claim 8, wherein said vulcanizable rubber composition comprises silica and carbon black in a combined concentration of from about 20 to about 100 phr.

13. The pneumatic tire of claim 8, wherein said vulcanizable rubber composition comprises silica and carbon black in a combined concentration of from about 20 to about 100 phr and a weight ratio of about 1.

14. The pneumatic tire of claim 8, wherein said vulcanizable rubber composition further comprises from 0 to about 20 phr of 3,4-polyisoprene.

15. The pneumatic tire of claim 8, wherein the emulsion or solution polymerized styrene-butadiene rubber with a styrene content of from about 20 to about 40 percent by weight acts as a compatibilizer between the polybutadiene and the solution polymerized styrene-butadiene rubber with a styrene content of from about 38 to about 50 percent by weight and a Tg of from about −22° C. to about −10° C.

* * * * *